US009852260B2

(12) United States Patent
Guillorn et al.

(10) Patent No.: US 9,852,260 B2
(45) Date of Patent: Dec. 26, 2017

(54) METHOD AND RECORDING MEDIUM OF REDUCING CHEMOEPITAXY DIRECTED SELF-ASSEMBLED DEFECTS

(71) Applicant: International Business Machines Corporation, Armonk, NY (US)

(72) Inventors: Michael A. Guillorn, Cold Springs, NY (US); Kafai Lai, Poughkeepsie, NY (US); Chi-Chun Liu, Altamont, NY (US); Ananthan Raghunathan, Wappingers Falls, NY (US); Hsinyu Tsai, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/167,247

(22) Filed: May 27, 2016

(65) Prior Publication Data

US 2017/0344694 A1    Nov. 30, 2017

(51) Int. Cl.
*G06F 17/50* (2006.01)
*H01L 29/66* (2006.01)

(52) U.S. Cl.
CPC ...... *G06F 17/5081* (2013.01); *G06F 2217/12* (2013.01); *H01L 29/66795* (2013.01)

(58) Field of Classification Search
CPC ............. G06F 17/5081; G06F 17/5068; G06F 17/5072
USPC .................................................... 716/53, 55
See application file for complete search history.

(56) References Cited

U.S. PATENT DOCUMENTS

| 8,656,322 | B1 * | 2/2014 | Dechene et al. ...... | G03F 7/0002 |
| | | | | 716/55 |
| 8,898,606 | B1 * | 11/2014 | Abou Ghaida et al. ............... | G06F 17/5081 |
| | | | | 716/111 |
| 9,032,357 | B1 * | 5/2015 | Robles et al. ........ | G03F 7/0002 |
| | | | | 716/136 |
| 2015/0227676 | A1 * | 8/2015 | Robles et al. ...... | G06F 17/5081 |
| | | | | 716/54 |

* cited by examiner

*Primary Examiner* — Sun Lin
(74) *Attorney, Agent, or Firm* — Jennifer R. Davis, Esq.; McGinn IP Law Group, PLLC

(57) ABSTRACT

A method, system, and non-transitory computer readable medium for reducing chemo-epitaxy directed-self assembly (DSA) defects of a layout of a guiding pattern, include inserting an internal dummy between a first portion of the guiding pattern and a second portion of the guiding pattern if a vertical spacing is equal to or greater than a first predetermined distance, inserting a first external dummy along an external edge of the guiding pattern in a vertical direction if the vertical spacing is greater than a second predetermined distance, and inserting an anti-taper structure on the first external dummy if a second distance from the external edge of the guiding pattern to the edge of the first external dummy is greater than a first distance.

20 Claims, 11 Drawing Sheets

US 9,852,260 B2

METHOD AND RECORDING MEDIUM OF REDUCING CHEMOEPITAXY DIRECTED SELF-ASSEMBLED DEFECTS

BACKGROUND

The present invention relates generally to a method for reducing chemo-epitaxy Directed Self-Assembly (DSA) defects, and more particularly, but not by way of limitation, to a method and recording medium of reducing the Directed Self Assembly (DSA) defects formed at a boundary of a circuit block as well as across a large gap between two groups of close pitch lines due to a chemo-epitaxy DSA process.

The directed self-assembly (DSA) of block co-polymers (BCPs) is a promising technology to extend patterning resolution. Chemo-epitaxy, a form of DSA, has been demonstrated to reliably generate dense grating and hexagonal arrays from sparse chemical pre-patterns comprising a directing (pinning) region and a non-directing (neutral) region that support perpendicular orientation of BCP domains. Typically, the directing region confers alignment on the BCP domains via a preferential affinity to one of the domains. The neutral region may have little or no affinity to any of the domains.

Some conventional techniques describe a guiding pattern mask decomposition method specific for Chemoepitaxy DSA process. The conventional techniques includes the use of internal dummy guiding (neutral) patterns.

However, the conventional techniques have a technical problem in that the conventional techniques do not consider an issue of how to design internal dummy guiding patterns optimally. Further, the conventional techniques do not consider the use of external dummy features which are critical and the proper way to design them to reduce DSA defects formed near the edge of the circuit block. Further, the conventional techniques do not include the external dummy patterns together with the usual global fill patterns for a chemoepitaxy process.

That is, a chemoepitaxy DSA process requires a restricted set of pattern periodicity and dimensions to make sure DSA is commensurable (i.e., phase segregation) without defect formation. However in real VLSI circuit design, the patterns are in general not fixed gratings. The guiding patterns derived from the design have various quantized widths and spacing. Defects tend to form when the spacing between guiding patterns is larger than a set value. The pattern at the boundary of a cell block will see a large empty area as opposed to the interior of the block. The large empty area will be a source of defects too. The inventors aim to solve the defects problem by special dummy guiding patterns insertion, internal and external, in a Fin Field Effect Transistor (FinFET) integrated circuits design.

Thus, there is a problem in the art that in the conventional techniques, DSA defects form near the edge of the circuit patterns if a properly designed dummy patterns there around is not formed.

SUMMARY

In an exemplary embodiment, the present invention can provide a method to generate local dummy guiding (neutral) patterns for Chemo-epitaxy process to reduce design-induced DSA defects.

In an exemplary embodiment, the present invention can provide a method for reducing chemo-epitaxy directed-self assembly (DSA) defects of a guiding pattern layout, the method including detecting a vertical spacing between a first portion of the guiding pattern and a second portion of the guiding pattern, inserting an internal dummy between the first portion of the guiding pattern and the second portion of the guiding pattern if the vertical spacing is equal to or greater than a first predetermined distance, inserting a first external dummy along an external edge of the guiding pattern in a vertical direction if the vertical spacing is greater than a second predetermined distance, determining a first distance from the external edge of the guiding pattern to an edge of the first external dummy adjacent to the external edge, and inserting an anti-taper structure on the first external dummy if a second distance from the external edge of the guiding pattern to the edge of the first external dummy is greater than the first distance.

Further, in another exemplary embodiment, the present invention can provide a non-transitory computer-readable recording medium recording a program for reducing chemo-epitaxy directed-self assembly (DSA) defects of a guiding pattern layout, the program causing a computer to perform: detecting a vertical spacing between a first portion of the guiding pattern and a second portion of the guiding pattern, inserting an internal dummy between the first portion of the guiding pattern and the second portion of the guiding pattern if the vertical spacing is equal to or greater than a first predetermined distance, inserting a first external dummy along an external edge of the guiding pattern in a vertical direction if the vertical spacing is greater than a second predetermined distance, determining a first distance from the external edge of the guiding pattern to an edge of the first external dummy adjacent to the external edge, and inserting an anti-taper structure on the first external dummy if a second distance from the external edge of the guiding pattern to the edge of the first external dummy is greater than the first distance.

Even further, in another exemplary embodiment, the present invention can provide a computer system for reducing chemo-epitaxy directed-self assembly (DSA) defects of a guiding pattern layout, said system including a processor and a memory, the memory storing instructions to cause the processor to: detect a vertical spacing between a first portion of the guiding pattern and a second portion of the guiding pattern, insert an internal dummy between the first portion of the guiding pattern and the second portion of the guiding pattern if the vertical spacing is equal to or greater than a first predetermined distance, insert a first external dummy along an external edge of the guiding pattern in a vertical direction if the vertical spacing is greater than a second predetermined distance, determine a first distance from the external edge of the guiding pattern to an edge of the first external dummy adjacent to the external edge, and insert an anti-taper structure on the first external dummy if a second distance from the external edge of the guiding pattern to the edge of the first external dummy is greater than the first distance.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

FIG. 3 exemplarily shows a pinning trench width of the semiconductor device of 4LO or greater and an internal dummy 50a.

FIG. 6 exemplarily shows placement of a plurality of dummies 50b and 51 and an anti-taper structure 51a.

DETAILED DESCRIPTION

Figure 1A:
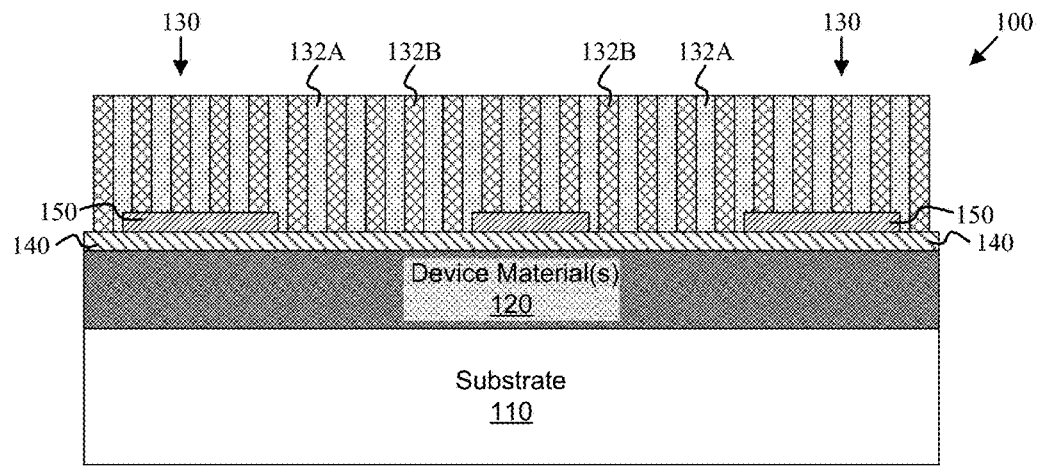
FIGS. 1A-1C are cross-sectional view illustrations of a semiconductor device during various stages of chemo-epitaxial patterning.

The invention will now be described with reference to FIGS. 1-12, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

A block co-polymer for self-assembly comprises at least two blocks that are immiscible with each other. Self-assembly of the block co-polymer occurs by phase separation of the blocks to form a pattern of segregated solid phase domains. The directed self-assembly of the segregated solid phase domains may be controlled by a pre-pattern formed over one or more layers (e.g. of a semiconductor device) that are to be patterned according to the pre-pattern aligned block co-polymer.

Figure 1B:
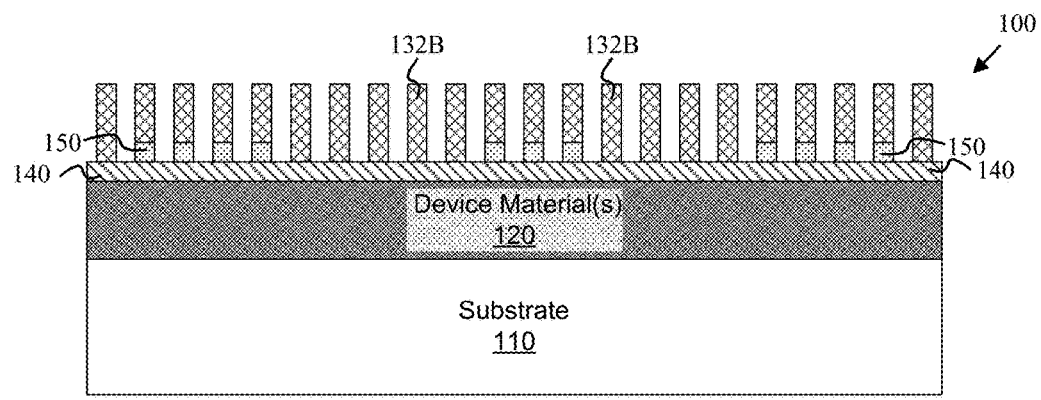
Figure 1C:
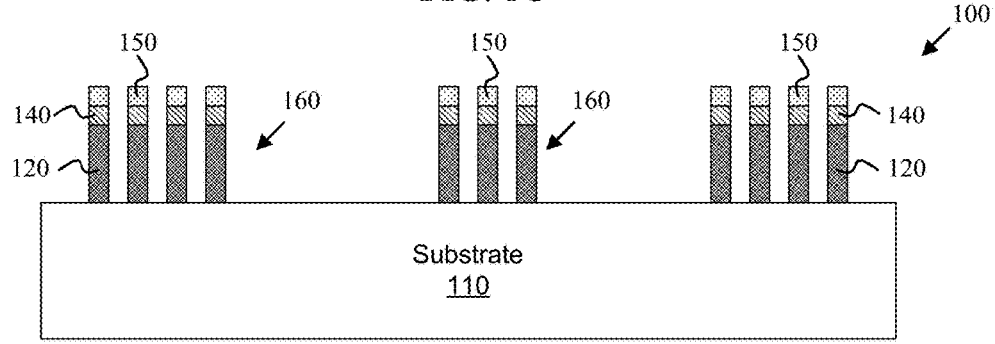

For example, FIGS. 1A-1C are cross-sectional view illustrations of a semiconductor device 100 during various stages of chemo-epitaxial patterning. Manufacture of the semiconductor device 100, or the like, is one example of an application suitable for the present invention.

A substrate 110 may have one or more device materials 120 formed thereon that are to be patterned. In the depicted embodiment, the device material(s) 120 are used to form device features 160 such as fins. To facilitate high density patterning of the device material(s) 120, directed self-assembly (DSA) of a di-block polymer 130 may be used to provide alternating blocks of two co-polymers 132 (i.e., 132A and 132B). In the depicted embodiment, the co-polymers 132 have a pitch of LO.

Figure 2:
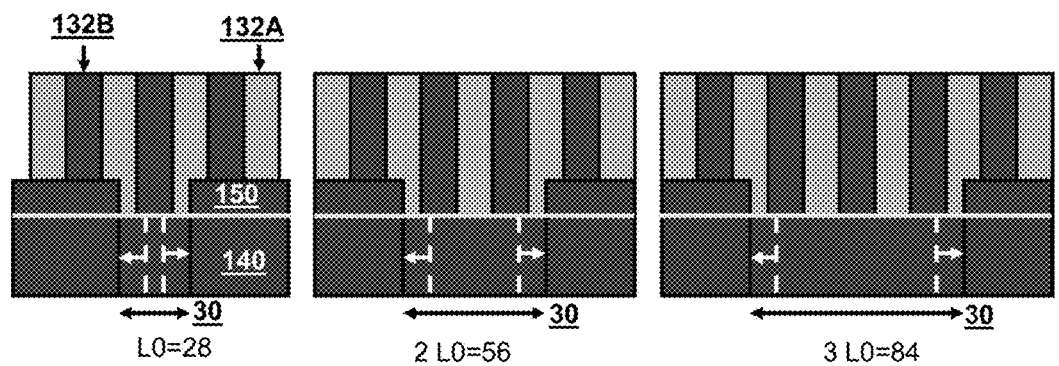
FIG. 2 exemplarily shows a pinning trench width of the semiconductor device within 4LO.
Figure 3:
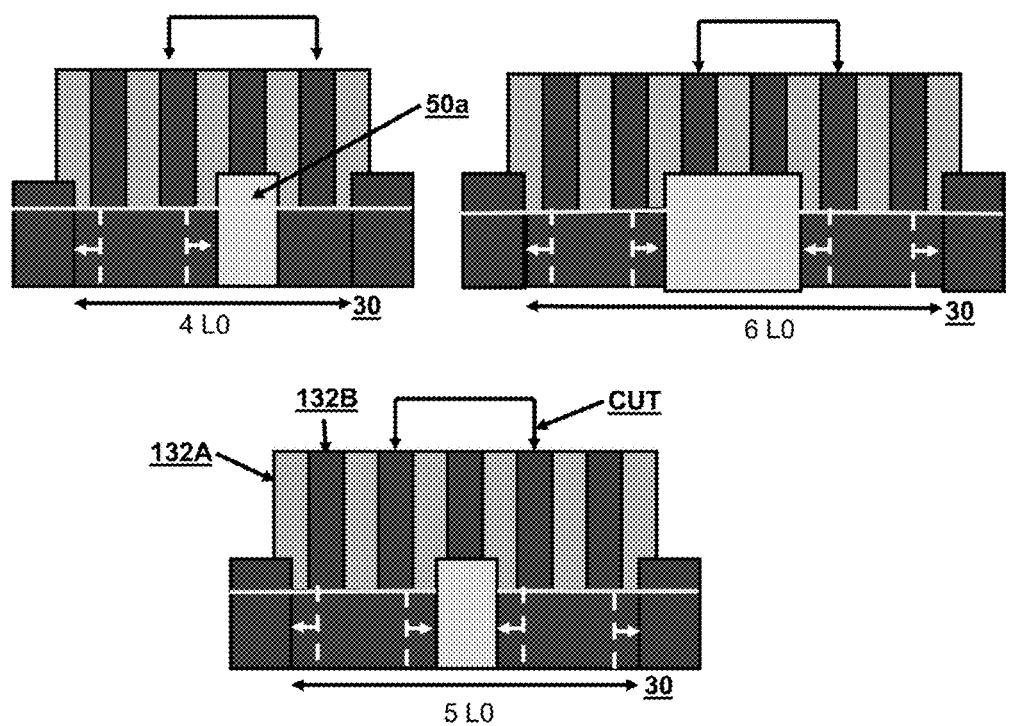

A pinning layer 140 and a neutral layer 150 may be formed over the device material(s) 120. The pinning layer 140 and the neutral layer 150 may be patterned to direct the self-assembly of the block co-polymer 130. In the depicted embodiment, the neutral layer 150 is deposited onto the pinning layer 140 and patterned to expose selected regions of the pinning layer 140. In another embodiment, the pinning layer 140 is disposed above the neutral layer 150 and patterned to expose selected regions of the neutral layer 150. The patterned and exposed pinning layer 140 and neutral layer 150 in either embodiment may be referred to as a pre-pattern in that the final pattern imposed on the device material(s) 120 is determined by the chemo-epitaxial interaction between the co-polymers 132 and the layers 140 and 150. Further, the pinning trench width 30 (as shown in FIG. 2 and FIG. 3) is a distance between neutral layers 150 on the pinning layer 140. In other words, the pinning trench width 30 is the exposed portions of the pinning layer 140.

For example, the pinning layer 140 may have a preferential affinity to one of the co-polymers 132 which in the depicted embodiment is the co-polymer 132B. The preferential affinity may align the block co-polymers 132 to the exposed portions of the pinning layer 140. In some embodiments, the block co-polymers 132 have a bulk periodicity of LO and the width of the exposed portions of the pinning layer 140 (i.e., the pinning trench width 30) is approximately 0.5×Lo (i.e., 0.5 times Lo) or approximately 1.5×N×Lo, where N is a positive integer.

It is noted that LO is the characteristic length of the block co-polymer material and will set the pitch of the assembled gratings. LO is a material constant so the design dimension is usually expressed in an integer number of LO.

As shown in FIG. 1B, the pre-pattern aligned co-polymers 132 may undergo a first etch that selectively removes one of the co-polymers 132. In the depicted embodiment, the co-polymer 132A is removed and the co-polymer 132B is used as a mask for a second etch that patterns the device material(s) 120 as shown in FIG. 1C. Subsequently, the pinning layer 140 and the neutral layer 150 may be removed to facilitate further processing of the semiconductor device 100 with patterned device features 160.

Examples of the co-polymers 132 include block copolymers of poly(styrene (PS)-block-methyl methacrylate) or PS-b-PMMA. Examples of a pinning layer 140 include a polystyrene grating layer. Examples of materials suitable for the neutral layer 150 include silicon dioxide or silicon nitride. In some embodiments, only the surface of the neutral layer 150 is neutral. For example, an oxide may be formed on the surface of the neutral layer 150.

Referring to FIG. 2, the pinning trench width 30 is exemplarily shown for a situation in which the pinning trench width 30 is LO, 2 LO, and 3 LO each of which is less than 4 LO. When pinning trench width 30 is less than 4 LO, good DSA alignment is achieved.

However, as shown in FIG. 3, if the pinning trench width 30 is equal to or greater than 4 LO, the fins provide weak guiding. Therefore, an internal dummy 50a is added to reduce the pinning trench width 30. As shown in the 5 LO and 6 LO depictions, it is preferable that the internal dummy 50a is inserted into the device such that the pinning trench width 30 on either side of the internal dummy 50a is constant (i.e., uniform).

Figure 4:
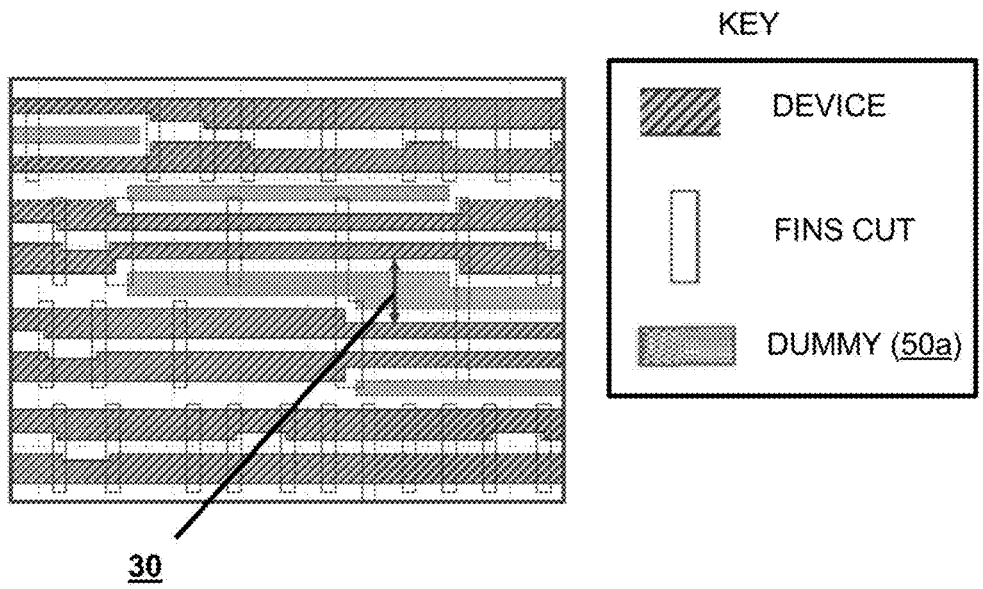
FIG. 4 exemplarily shows the internal dummy 50a inserted into the semiconductor device.

As shown in FIG. 4, the internal dummy 50a has a variable width such that a distance between the device and an edge of the internal dummy 50a is equal on either side of the internal dummy 50a. Thus, as shown in the middle portion of FIG. 4, the internal dummy 50a changes a width thereof such that the pinning trench width 30 on either side of the internal dummy 50a remains constant (i.e., uniform).

Figure 5:
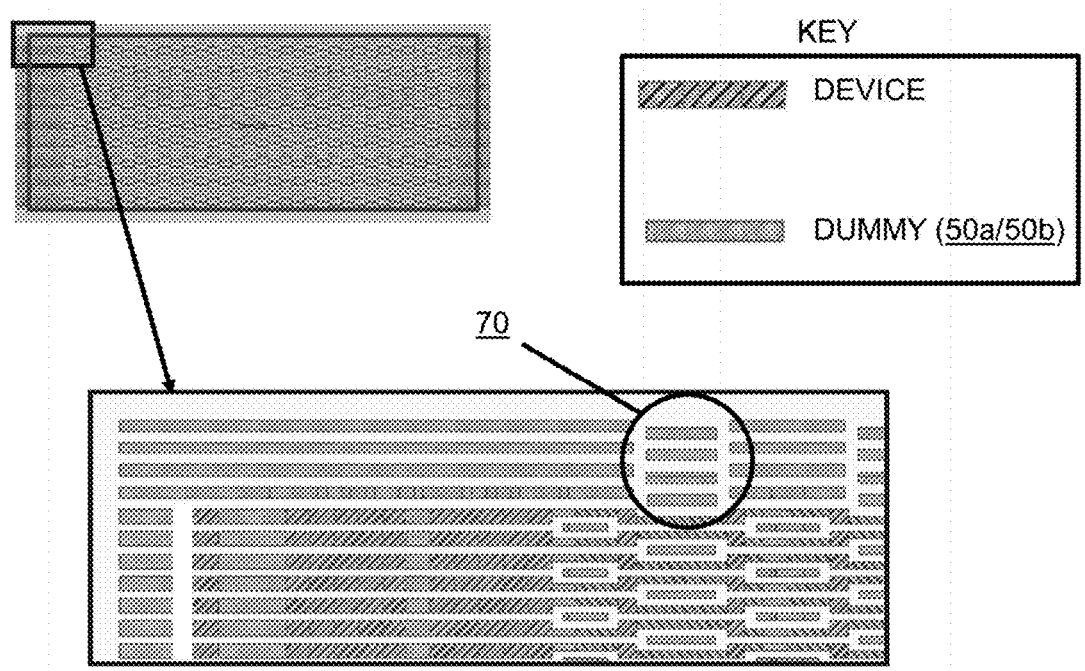
FIG. 5 exemplarily shows a conventional PRintable Assist Feature-like (PRAF) placement of a plurality of external dummies 50b.

FIG. 5 exemplarily shows a placement of external dummies 50b of a related art. As shown in region 70, the conventional PRAF techniques of external dummy 50b placement results in the external dummy 50b not being one-dimensional.

Figure 6:
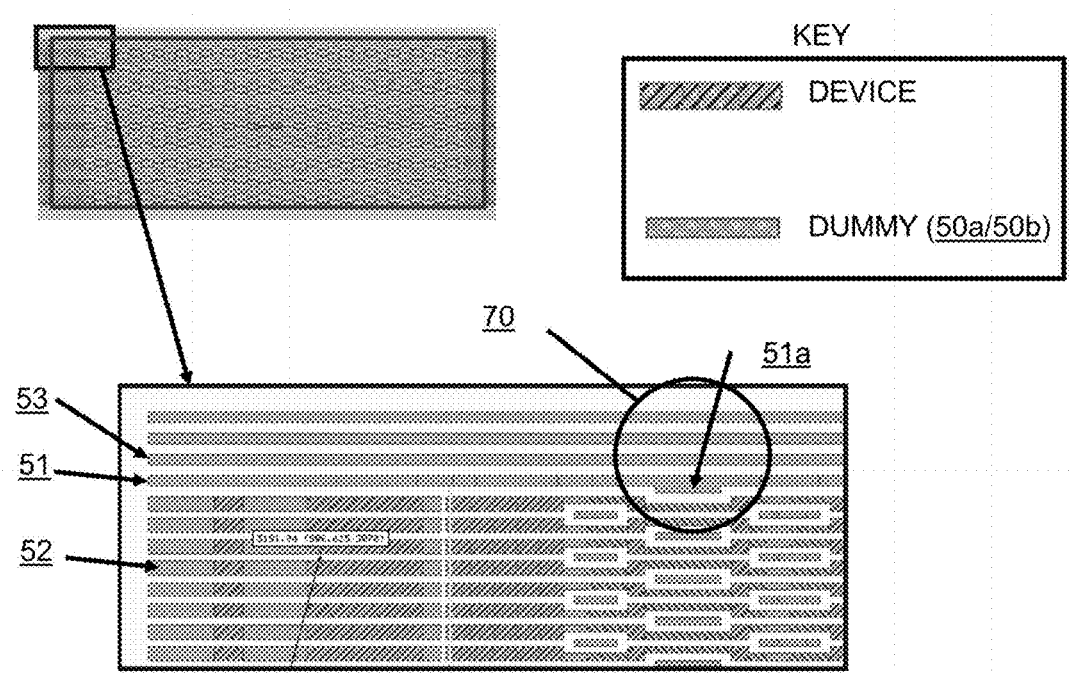

As shown in FIG. 6 according to an embodiment of the present invention, the external dummy 51 is placed such that the external dummy includes an anti-taper structure 51a. Thus, by only having the most adjacent (i.e., closest) external dummy 51 be two-dimensional as shown in the region 70, at least one other external dummies 50b can be placed such that the external dummies 50b are one-dimensional. In other words, by including the anti-taper structure 51a, the edge of the most adjacent external dummy 51 opposite to the circuit will always be a straight edge such that the next external dummy 50b can be inserted as a rectangle (i.e., one-dimensional) to improve uniformity.

Figure 7A:
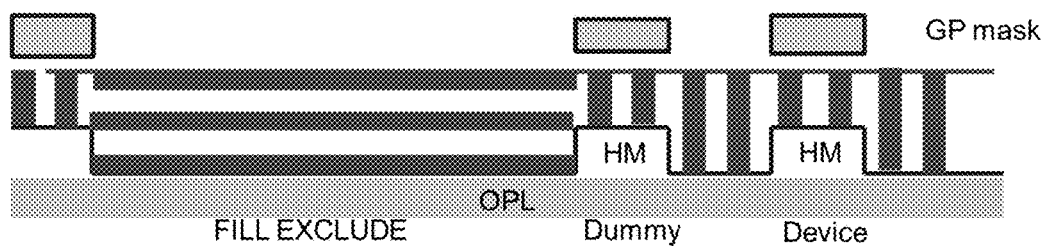
FIGS. 7A-7C exemplarily shows a process of cutting dummy fins.
Figure 7B:
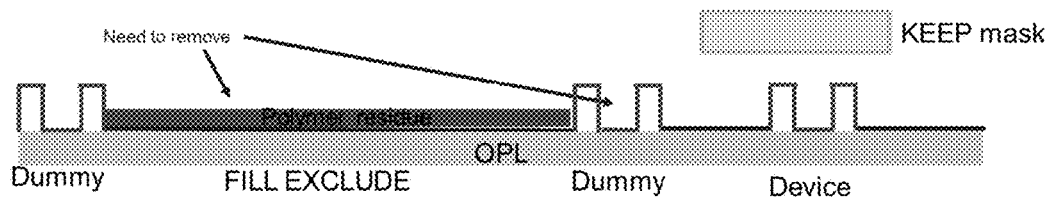
Figure 7C:
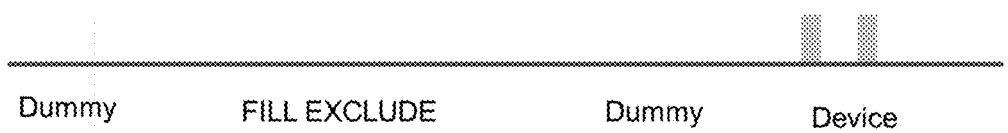

FIGS. 7A-7C exemplarily show the use of one guiding pattern mask that includes printing the dummies 50a/50b and a trim mask that primarily removes the dummy DSA formed at a second etch step. That is, FIGS. 7A-7C exemplarily show generating dummy removal mask shapes such that there is one dummy fin removal mask to remove dummy fins and flipped lamella in fill exclude region.

FIG. 7A depicts the first guiding pattern patterning step and DSA. FIG. 7B depicts HM etch and second lithography in which the keep mask is extended. And, FIG. 7C depicts the device etching step.

As exemplarily shown in FIG. 7B, the keep mask is extended in each direction by a predetermined amount (i.e., "E_keep") and the internal dummies 50a and the polymer residue are subsequently removed with the extended keep mask protecting the device.

That is, in FIG. 7A, The GP mask is defining the mesa (Neutral region) that includes devices and dummies. All other regions are trenches, including the "FILL EXCLUDE" region. DSA is forming desired gratings in the devices/dummies area but will become fingerprints or even flipped over in the large empty open space.

In FIG. 7B, after etching down to the Hard Mask (HM), another lithography step to define the device area from the dummies and the Field region by a KEEP mask needs to be performed. All dummy HM features and anything on the field will be removed.

In FIG. 7C, after the etch step following the KEEP mask only the HM on the device structures remained thus forming a correct etch stop for the device etching through OPL and the substrate layers below.

Figure 8:
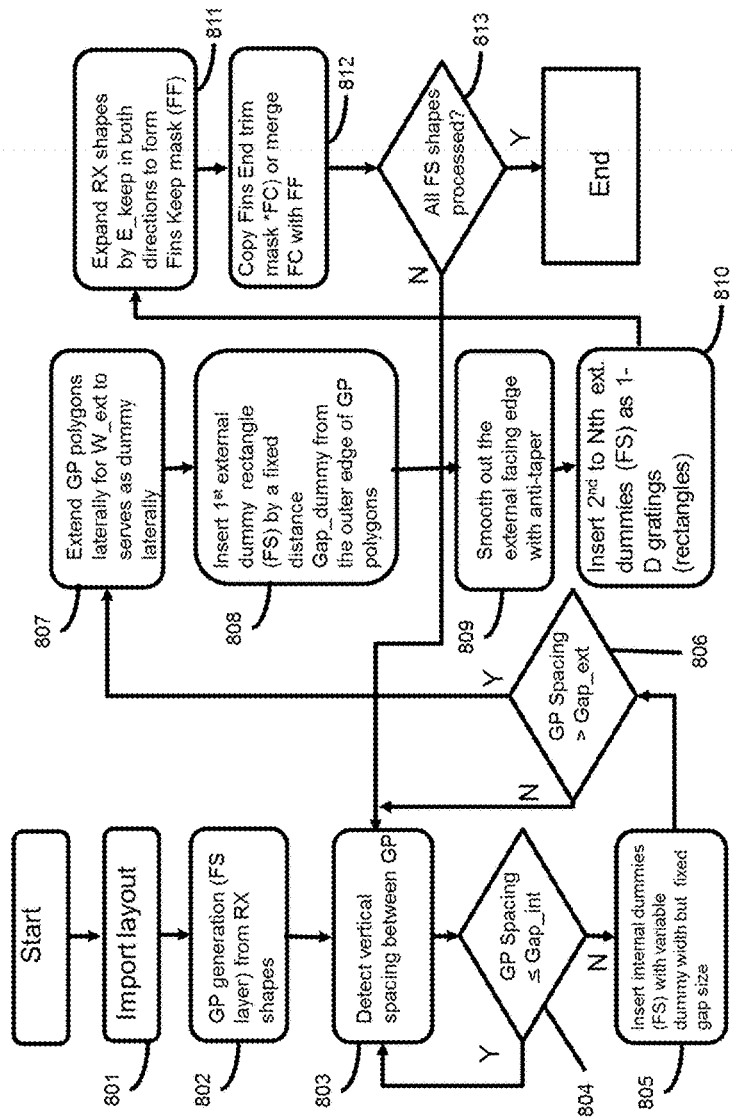
FIG. 8 exemplarily shows a high level flow chart for a method for reducing chemo-epitaxy Directed Self-Assembly (DSA) defects.

With reference now to FIG. 8, Step 801 imports a layout of a device.

Step 802 generates a guiding pattern (GP) from the cross-sectional shapes of the layout of the device.

Step 803 detects a vertical spacing between a first portion of the guiding pattern and a second portion of the guiding pattern (or a second point, if it is a edge).

Based on the detected vertical spacing by Step 803, Step 804 determines if the detected vertical spacing is less than a first predetermined distance (i.e., Gap_int). Preferably, the predetermined distance is set to 4 LO. That is, Step 804 detects the pinning trench width distance 30 (i.e., the distance shown in FIG. 4) between adjacent portions of the device.

If the detected distance of Step 803 is less than the first predetermined distance (e.g., 4 LO in one example), Step 804 returns to Step 803.

If the detected distance of Step 803 is equal to or greater than the first predetermined distance (i.e., a "NO" in Step 804), Step 805 inserts internal dummies 50a having a width such that a gap size on either side of the internal dummies 50a is fixed. That is, the internal dummies 50a have a variable width such that the gap size is fixed as shown in FIG. 4. In other words, Step 805 inserts internal dummies 50a in the pinning trench 30 such that the pinning trench width 30 is not greater than 4 LO and the gap between the inserted internal dummy 50a and the adjacent portion of the device is equal to the gap on the other side of the inserted internal dummy 50a and the adjacent portion of the device. Therefore, fin defects can be reduced.

Step 806 determines if the vertical spacing in the guiding pattern is greater than a second predetermined distance. That is, Step 806 determines if it is an edge location of the device.

If the guiding pattern spacing is not greater than the second predetermined distance, Step 803 is performed again because the portion of the guiding pattern being analyzed is not the edge and it should be determined if an internal dummy 50a needs to be inserted via Steps 803, 804, and 805.

Figure 9:
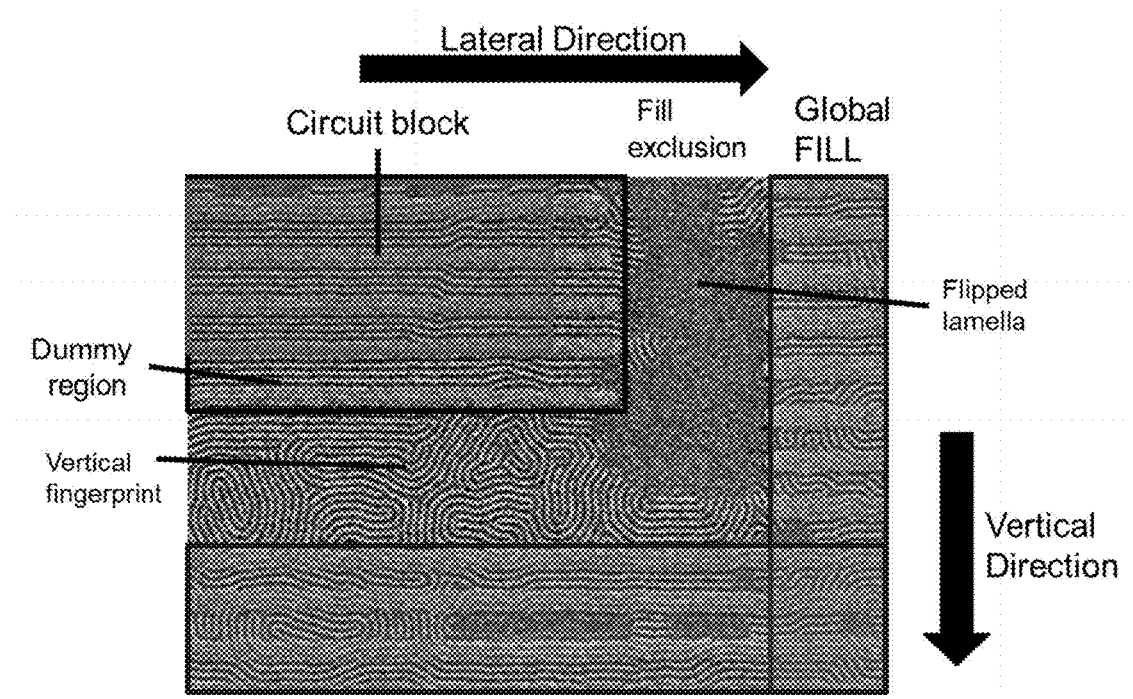
FIG. 9 exemplarily shows the DSA with the dummy region 50a/50b surrounding the circuit.

If the guiding pattern spacing is greater than the second predetermined distance, Step 807 extends the guiding pattern polygons laterally for a fixed distance (W_ext) to serve as a laterally extended external dummy 52 (i.e., the dummies that extend laterally from the guiding pattern). That is, Step 807 inserts a lateral dummy pattern around the edge of the circuit as shown in FIG. 9.

Step 808 inserts a first external dummy 51 at a first distance (e.g., fixed) from an outer edge of the guiding pattern in the vertical direction.

Step 809 determines if the first external dummy 51 is disposed at a distance from the outer edge of the guiding pattern greater than the first distance at any point along the edge of the first external dummy 51 nearest the outer edge of the guiding pattern. If the first external dummy 51 has a distance from the outer edge of the guiding pattern greater than the first distance, Step 809 inserts an anti-taper structure 51a such that a distance from an edge of the external taper 51a to the guiding pattern is equal to the first distance. That is, as shown in FIG. 6, the anti-taper structure 51a is inserted on the first external dummy 51 on a side of adjacent to the outer edge of the guiding pattern. As a result, the edge of the first external dummy 51 opposite to the outer edge of the guiding pattern has a one-dimensional edge (i.e., a straight edge).

Step 810 inserts at least a second external dummy 53 as a one-dimensional edge shape such that the edge adjacent to the outer edge of the first external dummy 51 is a straight edge and the outer edge of the second external dummy 53 is a straight edge. Preferably, the second external dummy 53 is a rectangular shape. Therefore, if a plurality of second external dummies 53 are inserted as shown in FIG. 6, each of the plurality of second external dummies 53 has a same shape and disposed at a same distance from each other thereby increasing consistent of the edge of the dummy which will minimize DSA defects at the edges.

Then, in Step 811, the guiding pattern shapes are expanded by a distance (i.e., "E_KEEP") in both lateral directions to form a fins keep mask FF.

In step 812, the FF mask can be a stand-alone mask or combined with the existed designed fins end trim mask FC, which is depending on design ground rules and lithography process.

In step 813, it is determined if all the consecutive shapes of the layout of the devices (in the FS layer) have been processed. if not, proceed to step 803. If YES, then the method ends.

FIG. 9 exemplarily shows the DSA with the dummy region 50a/50b surrounding the circuit.

Figure 10:
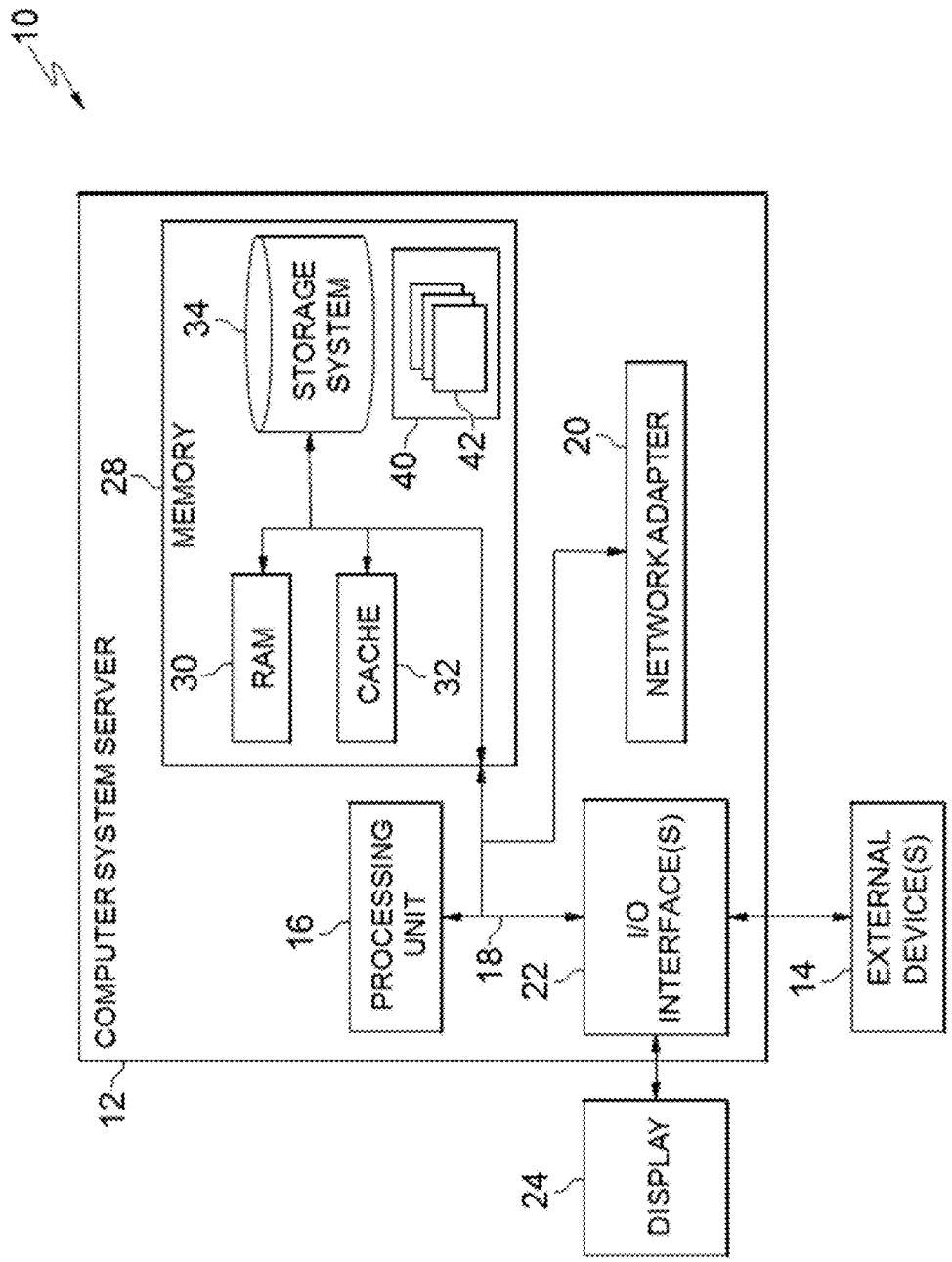
FIG. 10 depicts a cloud computing node according to an embodiment of the present invention.

Further, as shown in at least FIG. 10, one or more computers of a computer system 12 can include a memory 28 having instructions stored in a storage system to perform the steps of FIG. 8 detailed above.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 10, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 10, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 11:
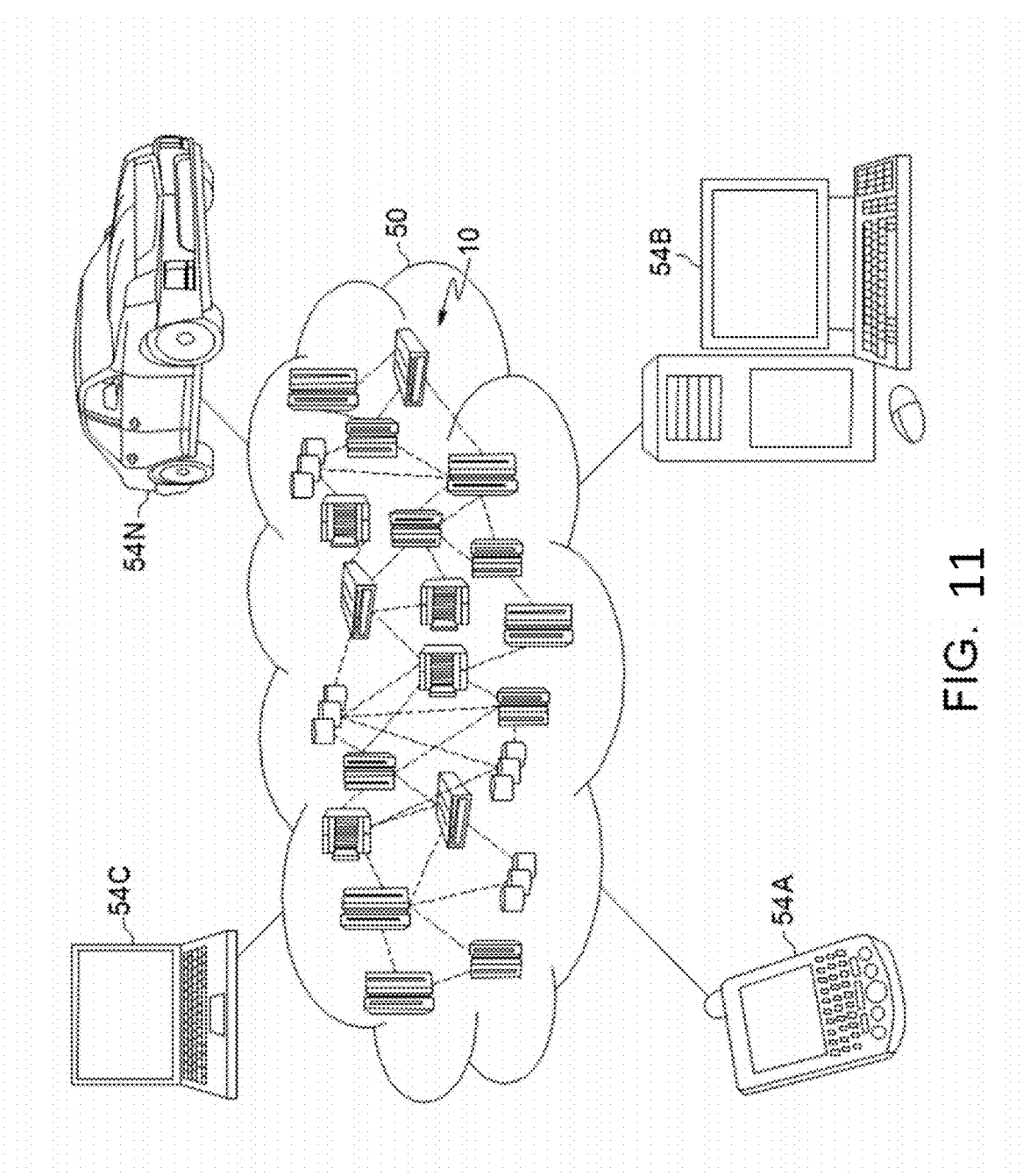
FIG. 11 depicts a cloud computing environment according to another embodiment of the present invention.

Referring now to FIG. 11, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 11 are intended to be illustrative only and that computing nodes 10 and cloud computing environment 50 can communicate with any type of computerized circuit over any type of network and/or network addressable connection (e.g., using a web browser).

Figure 12:
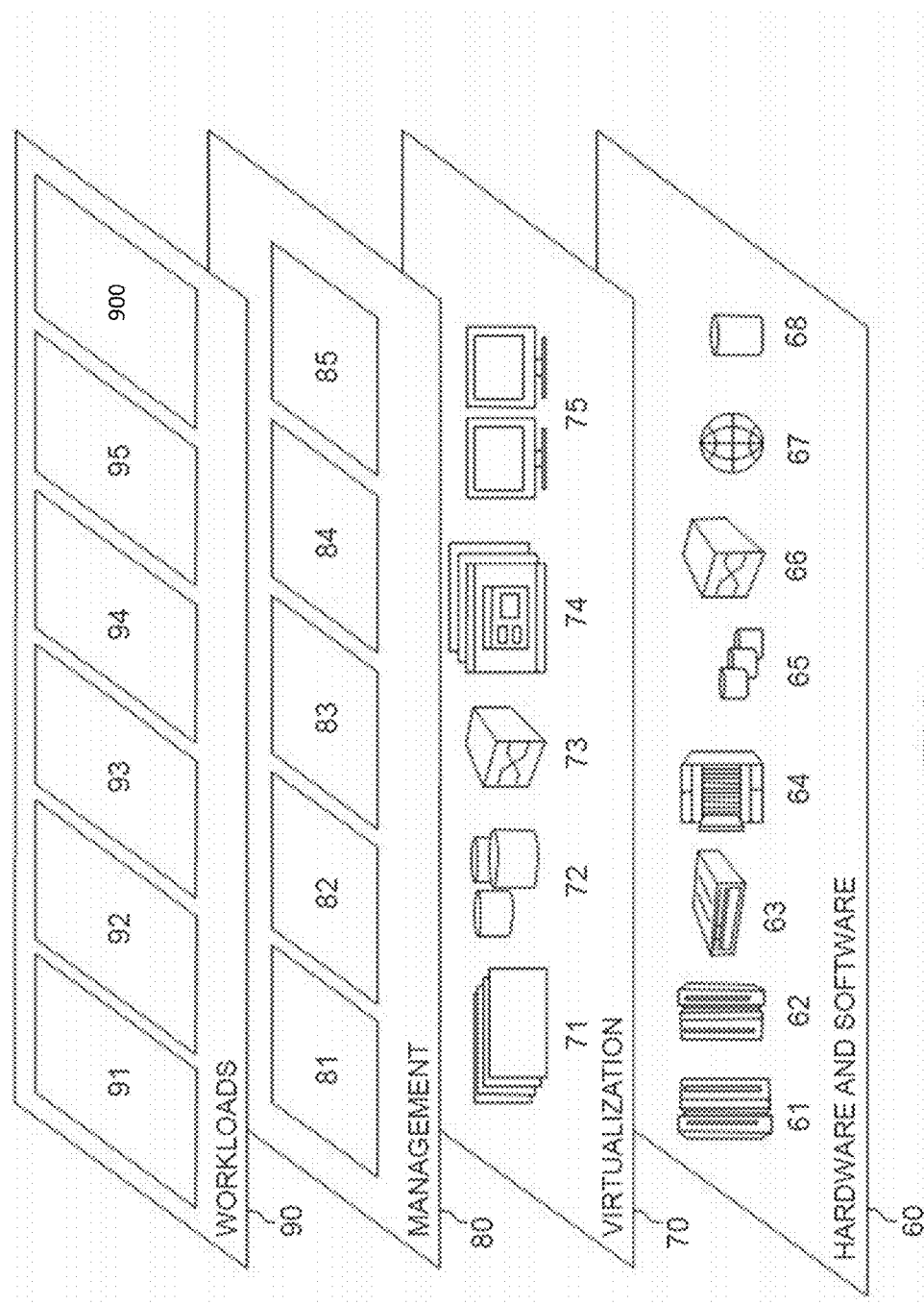
FIG. 12 depicts abstraction model layers according to an embodiment of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the anti-counterfeiting system 100 and the anti-counterfeiting system 600 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A method for reducing chemo-epitaxy directed-self assembly (DSA) defects of a layout of a guiding pattern, the method comprising:
   detecting a vertical spacing between a first portion of the guiding pattern and a second portion of the guiding pattern;
   inserting an internal dummy between the first portion of the guiding pattern and the second portion of the guiding pattern if the vertical spacing is equal to or greater than a first predetermined distance;
   inserting a first external dummy along an external edge of the guiding pattern in a vertical direction if the vertical spacing is greater than a second predetermined distance;
   determining a first distance from the external edge of the guiding pattern to an edge of the first external dummy adjacent to the external edge; and
   inserting an anti-taper structure on the first external dummy if a second distance from the external edge of the guiding pattern to the edge of the first external dummy is greater than the first distance.

2. The method of claim 1, further comprising:
   expanding a shape of the guiding pattern by a predetermined distance in both lateral directions to form a fin keep mask; and
   determining if all of consecutive shapes of the layout of the guiding patterns have been processed.

3. The method of claim 2, wherein the fin keep mask comprises a stand-alone mask.

4. The method of claim 2, wherein the fin keep mask is combined with the existing fin end trim masks.

5. The method of claim 1, wherein the anti-taper structure is disposed between the external edge of the guiding pattern and the edge of the first external dummy.

6. The method of claim 1, wherein a distance between an edge of the anti-taper structure and the external edge of the guiding pattern equals the first distance.

7. The method of claim 1, wherein the anti-taper structure is inserted on the first external dummy such that a distance between the anti-taper structure and the external edge of the guiding pattern equals the first distance between the external edge of the guiding pattern and the first external dummy.

8. The method of claim 1, wherein the anti-taper structure protrudes in the vertical direction from the first external dummy towards the guiding pattern.

9. The method of claim 1, further comprising inserting a second external dummy at a fixed distance from a second edge of the first external dummy.

10. The method of claim 9, wherein the second external dummy includes a two-dimensional shape such that at least two edges of the second external dummy are parallel to the second edge of the first external dummy.

11. The method of claim 9, wherein an edge of the second external dummy is parallel to the second edge of the first external dummy.

12. The method of claim 1, wherein a second edge of the first external dummy is one-dimensional, and
   wherein the internal dummy is inserted such that a distance between a first edge of the internal dummy and the first portion of the guiding pattern is less than 4 LO.

13. The method of claim 1, further comprising inserting a plurality of external dummies extending in a lateral direction of the guiding pattern such that edges of the plurality of external dummies correspond to edges of the guiding pattern.

14. The method of claim 1, wherein a distance between a first edge of the internal dummy and the first portion of the guiding pattern is equal to a distance between a second edge of the internal dummy and the second portion of the guiding pattern.

15. The method of claim 14, wherein a width of the internal dummy is set variably such that the distance between the first edge of the internal dummy and the first portion of the guiding pattern is always equal to the distance between the second edge of the internal dummy and the second portion of the guiding pattern.

16. The method of claim 14, wherein a width of the internal dummy is set variably.

17. The method of claim 14, wherein a width of a first portion of the internal dummy is greater than a width of a second portion of the internal dummy, and
   wherein the vertical spacing between the first portion of the guiding pattern and the second portion of the guiding pattern comprises a pinning trench width.

18. The method of claim 14, wherein a distance from the first edge to the first portion of the guiding pattern is less than a distance from the second edge to the first portion of the guiding pattern.

19. A non-transitory computer-readable recording medium recording a program for reducing chemo-epitaxy directed-self assembly (DSA) defects of a layout of a guiding pattern, the program causing a computer to perform:
  detecting a vertical spacing between a first portion of the guiding pattern and a second portion of the guiding pattern;
  inserting an internal dummy between the first portion of the guiding pattern and the second portion of the guiding pattern if the vertical spacing is equal to or greater than a first predetermined distance;
  inserting a first external dummy along an external edge of the guiding pattern in a vertical direction if the vertical spacing is greater than a second predetermined distance;
  determining a first distance from the external edge of the guiding pattern to an edge of the first external dummy adjacent to the external edge; and
  inserting an anti-taper structure on the first external dummy if a second distance from the external edge of the guiding pattern to the edge of the first external dummy is greater than the first distance.

20. A computer system for reducing chemo-epitaxy directed-self assembly (DSA) defects of a layout of a guiding pattern, said system comprising:
  a processor; and
  a memory, the memory storing instructions to cause the processor to:
    detect a vertical spacing between a first portion of the guiding pattern and a second portion of the guiding pattern;
    insert an internal dummy between the first portion of the guiding pattern and the second portion of the guiding pattern if the vertical spacing is equal to or greater than a first predetermined distance;
    insert a first external dummy along an external edge of the guiding pattern in a vertical direction if the vertical spacing is greater than a second predetermined distance;
    determine a first distance from the external edge of the guiding pattern to an edge of the first external dummy adjacent to the external edge; and
    insert an anti-taper structure on the first external dummy if a second distance from the external edge of the guiding pattern to the edge of the first external dummy is greater than the first distance.

* * * * *